United States Patent
Meier (10) Patent No.: US 11,163,673 B1
(45) Date of Patent: Nov. 2, 2021

(54) ENHANCED TESTING BY AUTOMATED REUSE OF TEST METRICS

(71) Applicant: SAP SE, Walldorf (DE)

(72) Inventor: Andreas Meier, Wilhermsdorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/864,674

(22) Filed: May 1, 2020

(51) Int. Cl.
*G06F 9/44* (2018.01)
*G06F 11/36* (2006.01)
*G06F 11/30* (2006.01)
*G06F 11/34* (2006.01)

(52) U.S. Cl.
CPC ........ *G06F 11/3688* (2013.01); *G06F 11/302* (2013.01); *G06F 11/3457* (2013.01); *G06F 11/368* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 9,021,458 B1* | 4/2015 | Jacob | G06F 8/60 717/168 |
| 2006/0288052 A1* | 12/2006 | Chen | G06F 16/284 |
| 2007/0038898 A1* | 2/2007 | Clee | G06F 11/3688 714/38.1 |
| 2011/0314454 A1* | 12/2011 | Godefroid | G06F 11/3676 717/131 |
| 2016/0350099 A1* | 12/2016 | Suparna | G06F 11/368 |
| 2018/0113799 A1* | 4/2018 | M.V. | G06F 11/3684 |
| 2020/0241864 A1* | 7/2020 | Duvur | G06F 8/65 |

* cited by examiner

*Primary Examiner* — Qamrun Nahar
(74) *Attorney, Agent, or Firm* — Sterne, Kessler, Goldstein & Fox P.L.L.C.

(57) ABSTRACT

Disclosed herein are system, apparatus, method, and computer program product embodiments for testing software in a continuous deployment pipeline. An embodiment operates by automatically deploying a second version of an application at an idle endpoint. The embodiment further operates by automatically testing the second version of the application by reusing test metrics associated with a first version of the application that is live at a live endpoint. The embodiment further operates by automatically determining whether the automatic testing of the second version of the application is successful and, if so, automatically setting live the second version of the application. For example, the embodiment can operate by automatically exchanging the live endpoint with the idle endpoint to set live the second version and set idle the first version, which then may be placed in termination.

17 Claims, 5 Drawing Sheets

ENHANCED TESTING BY AUTOMATED REUSE OF TEST METRICS

BACKGROUND

As part of software development, it can be essential to test software frequently to detect issues before users run into those issues. The frequency of testing has increased over time and new software versions now are often shipped immediately to users. However, the testing of these new software versions has become increasingly difficult due to the higher frequencies and amounts of their shipments to users.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for enhancing test coverage of new application versions by automated reuse of test metrics during a continuous deployment process.

Conventional testing of new versions of software applications has become increasingly difficult due to the higher frequencies and amounts of their shipments to users. These conventional testing methods are slow, require significant computational resources and manual interaction, and result in substantial downtime to deploy and test new application versions. For example, to deploy a new application version, conventional testing methods stop the current application version, deploy the new application version, perform operational tests on the new application version, and, if testing fails, roll back to the previous application version and start that application version. In contrast, the system, apparatus, device, method and/or computer program product embodiments, and/or combinations and sub-combinations thereof, described herein solve these technological problems by automating the testing and deployment of a new version of a software application through the reuse of test metrics from the current version of the software application. The automated tests can include, for example, functional tests (e.g., executed during software development) and operational tests (e.g., executed during software lifecycle). The reused test metrics can include, for example, key performance indicators (KPIs) and KPI metadata generated by the testing and monitoring of the current software version. In one illustrative example, the system, apparatus, device, method and/or computer program product embodiments, and/or combinations and sub-combinations thereof, described herein can be configured to deploy the current version N in a live environment (e.g., a live endpoint), deploy the new version N+1 in an idle environment (e.g., an idle endpoint), automatically test the new version N+1 using test metrics associated with the current version N, and, if the automatic testing of the new version N+1 is successful, exchange the live endpoint with the idle endpoint to set the new version N+1 live and place the current version N in termination.

Figure 1:
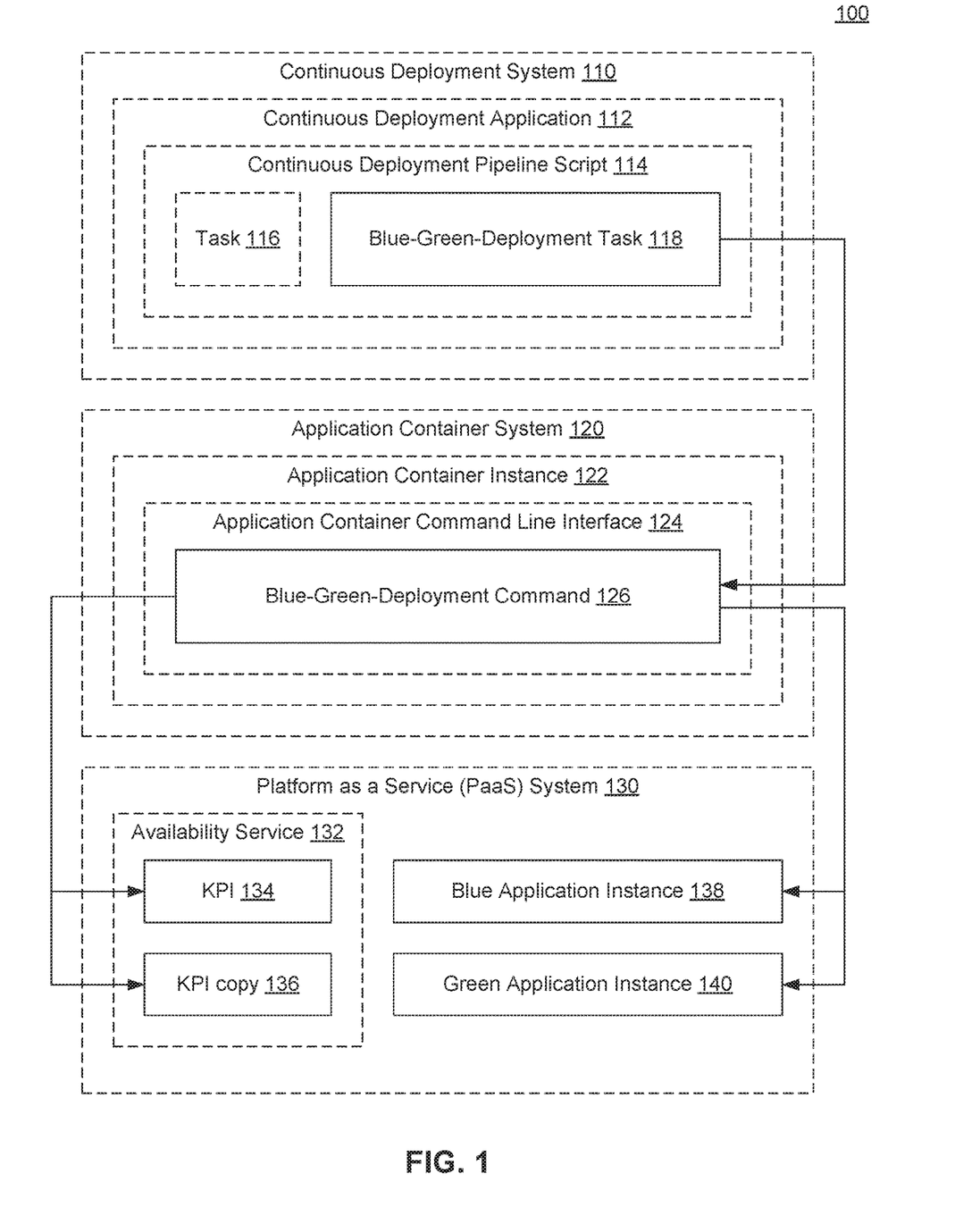
FIG. 1 is a block diagram of a system for automatically testing software in a continuous deployment pipeline, according to some embodiments.

FIG. 1 is a block diagram of a system 100 for automatically testing software in a continuous deployment pipeline, according to some embodiments. System 100 can include a continuous deployment system 110, an application container system 120, and a platform as a service (PaaS) system 130. As will be understood by a person of ordinary skill in the art, PaaS system 130 is not limited to a PaaS system and, in some embodiments, can additionally or alternatively include a backend as a service (BaaS) system, a mobile backend as a service (MBaaS) system, a content as a service (CaaS) system, a digital content as a service (DCaaS) system, a desktop as a service (DaaS) system, a framework as a service (FaaS) system, an infrastructure as a service (IaaS) system, a software as a service (SaaS) system, a managed software as a service (MSaaS) system, any other suitable cloud platform or "as a service" system, or any combination thereof.

In some embodiments, the continuous deployment system 110 can include a continuous deployment host that includes a continuous deployment application 112. In some embodiments, the continuous deployment application 112 can include a continuous deployment pipeline script 114 that includes a plurality of tasks, such as task 116 and blue-green-deployment task 118.

In some embodiments, the application container system 120 can include an application container host that includes an application container instance 122. In some embodiments, the application container instance 122 can include an application container command line interface 124 that includes a plurality of commands, such as blue-green-deployment command 126. In some embodiments, the PaaS system 130 can include an availability service 132, a blue application instance 138 (e.g., a live, current version N of a software application), and a green application instance 140 (e.g., an idle, new version N+1 of the software application that is a candidate to replace the blue application instance 138). In some embodiments, the availability service 132 can include a plurality of KPIs and KPI metadata, such as KPI 134 and KPI copy 136. In some embodiments, the KPI 134 can include one or more KPIs and KPI metadata associated with the blue application instance 138. In some embodiments, the KPI copy 136 can be a duplicate of the KPI 134. In some embodiments, the availability service 132 can be configured to generate the KPI copy 136 during the automatic testing of the green application instance 140. In some embodiments, the availability service 132 can be configured to remove, delete, or destroy the KPI copy 136 after the automatic testing of the green application instance 140 is complete to avoid double maintenance of the KPI 134. In some embodiments, the availability service 132 can be configured to store (e.g., directly or indirectly via one or more links or pointers) the plurality of KPIs and KPI metadata in one or more storage devices.

In some embodiments, the availability service 132 can be configured to monitor and test the blue application instance 138 and modify the KPI 134 based on updated or additional test metrics generated during the lifetime of the blue application instance 138. For example, the availability service 132 can be configured to change (e.g., enhance or simplify) the amount and shaping of the KPIs and KPI metadata included in the KPI 134 due to the testing of new features or other purposes. In some embodiments, the set of KPIs and KPI metadata included in the KPI 134 can further include KPIs and KPI metadata from, or generated based on, previous versions of the blue application instance 138.

In some embodiments, the system 100 can be configured to perform automated testing and deployment of application instances, such as the blue application instance 138 and the green application instance 140, in a continuous deployment pipeline that utilizes blue-green deployment. In some embodiments, the system 100 can be configured to determine which kinds of tests to execute and where to execute such tests. In some embodiments, the system 100 can be configured to execute automatically one or more operational tests, functional tests, or both using testing metrics for the blue application instance 138, such as KPI copy 136, to determine upfront if the green application instance 140 will run successfully in substantially the same way as the blue application instance 138. For example, the system 100 can be configured to generate the KPI 134 as a result of testing the blue application instance 138, previous versions of the blue application instance 138, or any combination thereof. During deployment of the green application instance 140, the system 100 can be further configured to automatically generate KPI copy 136 based on the KPI 134, automatically bound the KPI copy 136 to the green application instance 140, automatically test the green application instance 140 based on the KPI copy 136 using a different endpoint than the blue application instance 138, and, after the automated testing is complete, remove, delete, or destroy the KPI copy 136 (e.g., to avoid double maintenance of KPIs).

As used herein, the term "continuous deployment pipeline" refers to a complete, fully automated process chain (e.g., operated by a continuous deployment system), that includes uploading new or changed source code (e.g., to a software source repository), performing a build of the software (e.g., via containerization), performing automated checks and tests of the software, and, if the automated checks and tests are successful, releasing and deploying the software to a user environment. In some embodiments, a continuous deployment pipeline can include a loop including an automated building phase, an automated testing phase, an automated release phase, and an automated deployment phase. In some embodiments, the automated building phase of a continuous deployment pipeline can include: (i) checking out the code; (ii) running static analysis and testing; (iii) building artifacts; (iv) building images; (v) pushing the images to the registry; any other suitable operation; or any combination thereof. In some embodiments, the automated testing phase of a continuous deployment pipeline can include: (i) install the release under test; (ii) confirm that the release under test is running; (iii) run functional tests; (iv) remove the release under test; any other suitable operation; or any combination thereof. In some embodiments, the automated release phase of a continuous deployment pipeline can include: (i) pull the image of the release under test; (ii) tag the image as a specific release; (iii) tag the image as the latest release; (iv) push the image of the specific release; (v) push the image of the latest release; (vi) package the chart; (vii) push the chart; any other suitable operation; or any combination thereof. In some embodiments, the automated deployment phase of a continuous deployment pipeline can include: (i) upgrade the production release; (ii) run production tests; (iii) rollback in case of failure; any other suitable operation; or any combination thereof.

As used herein, the term "blue-green deployment" refers to a technique that reduces, and in some embodiments eliminates, downtime and risk by running two substantially identical production environments called "blue" and "green." The blue environment can be a live environment that includes a current version of a software application or software data, referred to as a "blue application," a "blue application version," or a "blue application instance." The green environment can be an idle environment that includes a new version of the software application or software data, referred to as a "green application," a "green application version," or a "green application instance." During development of the green application, automated deployment and testing of the green application can take place in the green environment while the blue application is live and running in the blue environment. Once the green application has been deployed and fully tested in the green environment, the green environment can become the live environment (e.g., the blue environment), and the blue environment can become the idle environment (e.g., the green environment). In some embodiments, blue-green deployment can be utilized to implement a substantially zero-downtime process to ship new software versions of applications. For example, a blue-green deployment process can: (i) run the blue application in the blue environment (e.g., the live environment); (ii) deploy the green application instance in the green environment (e.g., the idle environment) in parallel and utilizing substantially the same infrastructure as the blue application instance; and, (iii) when the green application is up-and-running (e.g., successfully passed automated testing), switch the network route (e.g., by switching endpoints) to the green application instance (e.g., substantially zero-downtime) and remove, delete, or destroy the blue application instance. In some embodiments, the term "deployed" can refer to an embodiment in which an application is running but not accessible by a user device, while the term "set live" can refer to an embodiment in which an application is both running and accessible by a user device.

In one illustrative example, the system 100 can be configured to implement a continuous deployment pipeline, operated by the continuous deployment system 110, that utilizes blue-green deployment by: (i) uploading the green application instance 140 (e.g., an updated version of the blue application instance 138) to the PaaS system 130; (ii) performing a build of the green application instance 140 in the application container system 120; (iii) performing automated checks and tests of the green application instance 140; (iv) if automated checks and tests are successful, setting live the green application instance 140 in a user environment and removing, deleting, or destroying the blue application instance 138; and (v) if automated checks and tests are not successful, removing, deleting, or destroying the green application instance 140.

In some embodiments, the system 100 can be configured to eliminate substantially the downtime associated with switching from the blue application instance 138 to the green application instance 140. In one example, typical switching can be achieved by stopping the blue application instance 138, deploying the green application instance 140, performing operational tests on the green application instance 140, and, if testing fails, rolling back to the blue application instance 138 and starting the blue application instance 138, resulting in downtime. In contrast, the system 100 can be configured to perform fully automated testing and deployment of the green application instance 140 without manual interaction and with substantially zero downtime. In some embodiments, the system 100 can be configured to switch from the blue application instance 138 to the green application instance 140 without manual interaction and with substantially zero downtime by automatically deploying the green application instance 140 with a different endpoint on the same infrastructure using a blue-green deployment technique, automatically testing the green application instance 140, and, if automated testing does not fail, automatically exchanging the endpoints to set the green application instance 140 live. If automated testing fails, the system 100 can be configured to automatically remove, delete, or destroy the green application instance 140.

Figure 2:
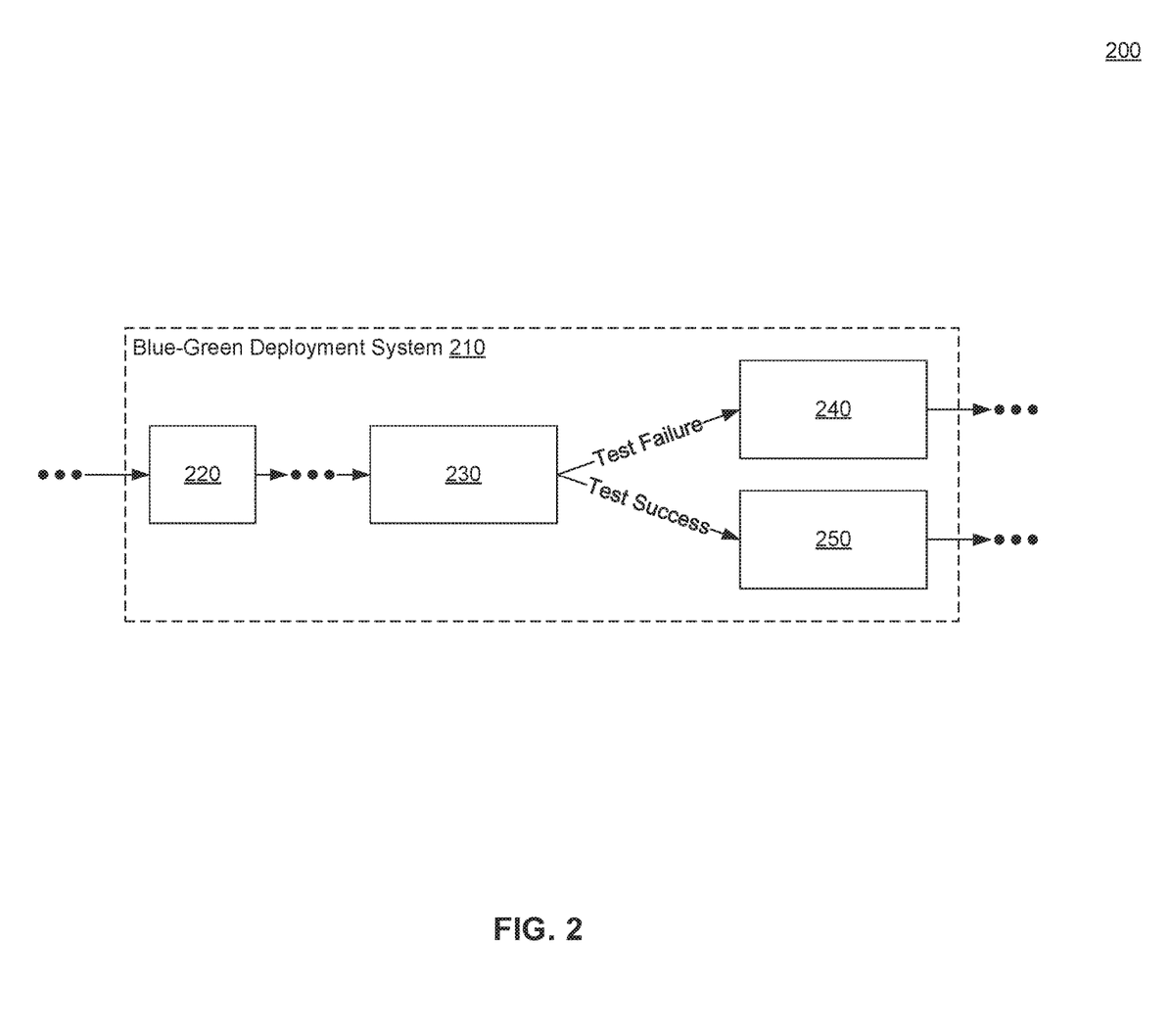
FIG. 2 is a block diagram of a system for continuous deployment, according to some embodiments.

FIG. 2 is a block diagram of a system 200 for continuous deployment, according to some embodiments. System 200 can include a blue-green deployment system 210. In some embodiments, the features and techniques of FIG. 2 can be performed, partially or wholly, by the blue-green deployment system 210. In some embodiments, the features and techniques of FIG. 2 can be performed, partially or wholly, by a system in communication with the system 200, such as a continuous deployment system, an application container system, a PaaS system, any other suitable system, or any combination thereof.

In some embodiments, the upload of a new or changed piece of software to a source code repository (e.g., new source code shipment) can trigger the blue-green deployment system 210 to start one cycle of continuous deployment, and the next upload of a new or changed piece of software to the source code repository by the same user device, or another user device, can trigger another cycle of continuous deployment performed by the blue-green deployment system 210. In some embodiments, multiple uploads of new or changed pieces of software to the source code repository can trigger multiple continuous deployment cycles to run at substantially the same time. In such embodiments, the blue-green deployment system 210 can implement a continuous deployment pipeline script that locks the phases of the continuous deployment pipeline against parallel execution.

At 220, the blue-green deployment system 210 can be configured to automatically deploy the green application in a green environment (e.g., an idle environment). For example, the blue-green deployment system 210 can be configured to automatically deploy a green application (e.g., a new or updated version of a live blue application) by automatically uploading the green application to a PaaS system and automatically building the green application in an application container system using the same infrastructure as a blue application but a different endpoint from the blue application.

At 230, the blue-green deployment system 210 can be configured to automatically test the green application based on test metrics associated with the blue application. For example, the blue-green deployment system 210 can be configured to automatically call an automated method to automatically test the green application based on test metrics associated with the blue application (e.g., by reusing KPIs and KPI metadata associated with the blue application). In some embodiments, the automated testing can include one or more of the following operations: (a) detect and download KPI metadata of existing, live KPIs associated with the blue application; (b) modify downloaded KPI metadata to the green application (e.g. by patching the endpoint); (c) upload modified KPI metadata to an availability service; (d) trigger test execution of the green application; (e) optionally wait a period of time until the test execution is complete; (f) download test results of green application metrics; (g) delete the green application metrics in the availability service; (h) evaluate the green application metrics based on go/no-go criteria (e.g., all tests must be successful; a percentage of tests must be successful; or any other suitable criteria); (i) return the evaluated test metrics to the blue-green deployment system 210; any other suitable operation; or any combination thereof.

At 240, if the automated testing of the green application is unsuccessful, the blue-green deployment system 210 can be configured to automatically destroy the green application. During 210, 220, 230, and 240 the blue application was live, usable, and testable (e.g., by an availability service), resulting in substantially zero downtime.

At 250, if the automated testing of the green application is successful, the blue-green deployment system 210 can be configured to automatically set live the green application (e.g., by automatically exchanging the blue endpoint with the green endpoint) and automatically set idle the blue application (and, in some embodiments, automatically destroy the blue application).

Figure 3:
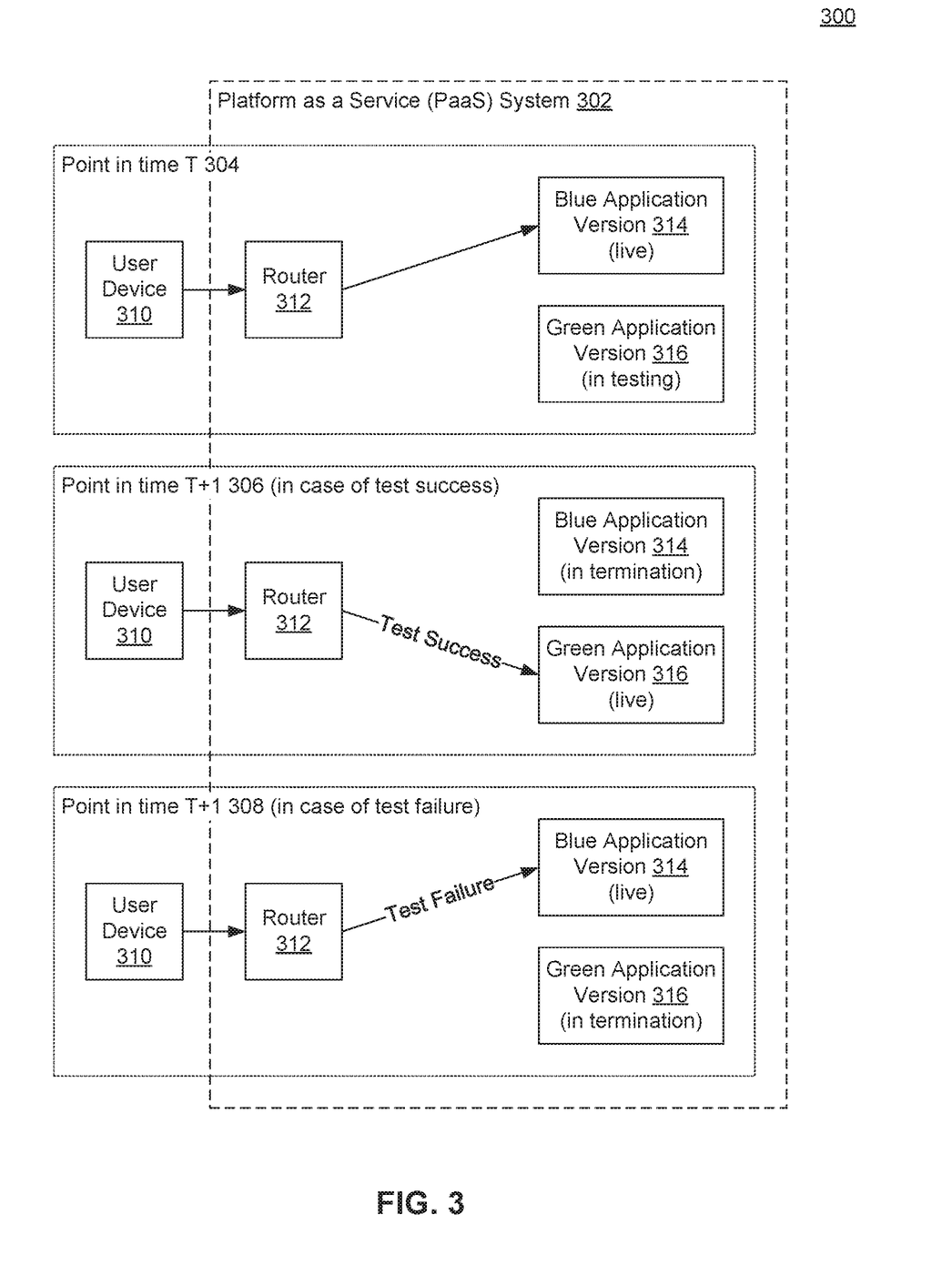
FIG. 3 is a block diagram of a system for blue-green deployment, according to some embodiments.

FIG. 3 is a block diagram of a system 300 for blue-green deployment, according to some embodiments. System 300 can include a PaaS system 302, a router 312, a blue application version 314 (e.g., live) of an application, and a green application version 316 (e.g., in testing) of the application. While some of the techniques and features of FIG. 3 are described as being performed by the PaaS system 302, in some embodiments the features and techniques of FIG. 3 can be performed, partially or wholly, by another system in communication with the PaaS system 302, such as a continuous deployment system, an application container system, a blue-green deployment system, any other suitable system, or any combination thereof.

At point in time T 304, the PaaS system 302 can be configured to run the blue application version 314 in a blue environment (e.g., a live environment) while performing automated testing of the green application version 316 in a green environment (e.g., an idle environment). For example, the blue application version 314 can utilize a blue endpoint (e.g., a live endpoint), and the green application version 316 can utilize a green endpoint (e.g., an idle endpoint) different from the blue endpoint. The PaaS system 302 can be further configured to receive a request to access the application from a user device 310. In response to the request, router 312 can be further configured to automatically route the request to the blue application version 314 at the blue endpoint.

At point in time T+1 306, if the automated testing of the green application version 316 has been automatically determined to be successful, the PaaS system 302 can be configured to automatically exchange the blue endpoint with the green endpoint to set the green application version 316 live. The PaaS system 302 can be further configured to automatically destroy the blue application version 314. Further at point in time T+1 306, the PaaS system 302 can be configured to receive a request to access the application from a user device 310. In response to the request, router 312 can be further configured to automatically route the request to the green application version 316 at the green endpoint. In some embodiments, the green application version 316 and the green endpoint now can be referred to as a blue application version and blue endpoint, respectively.

At point in time T+1 308, if the automated testing of the green application version 316 has been automatically determined to be unsuccessful, the PaaS system 302 can be configured to automatically destroy the green application version 316. Further at point in time T+1 306, the PaaS system 302 can be configured to receive a request to access the application from a user device 310. In response to the request, router 312 can be further configured to automatically route the request to the blue application version 314 at the blue endpoint.

Figure 4:
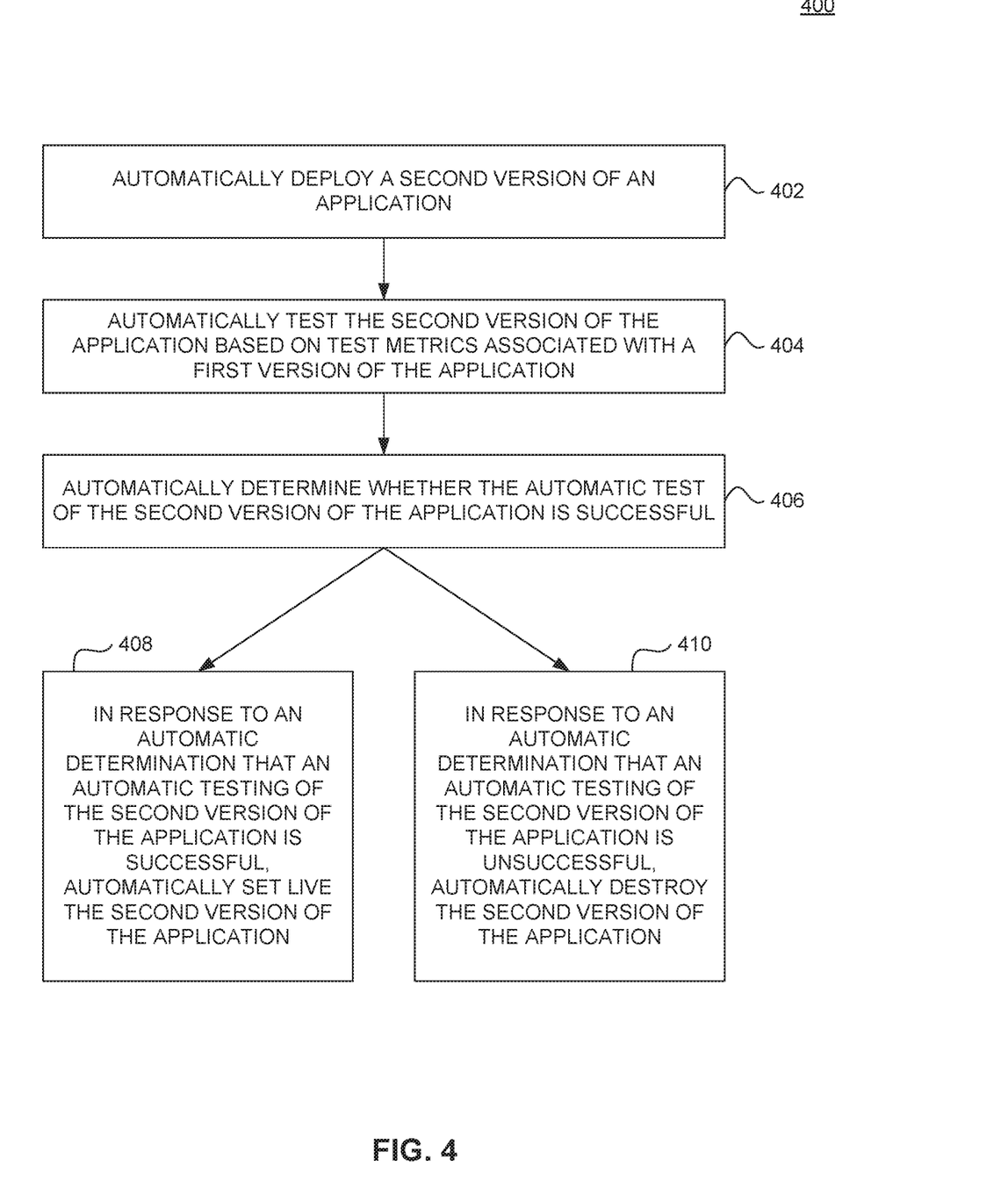
FIG. 4 is a flowchart illustrating a process for automatically testing software in a continuous deployment pipeline, according to some embodiments.

FIG. 4 is a flowchart for a method 400 for automatically testing software in a continuous deployment pipeline, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIG. 1. However, method 400 is not limited to that example embodiment.

In 402, system 100 automatically deploys a second version of an application. The second version of the application can be the green application instance 140 (e.g., a new or candidate version N+1) that is not live (e.g., idle). For example, system 100 can automatically deploy the second version of the application at an idle endpoint in an idle environment.

In 404, system 100 automatically tests the second version of the application based on (e.g., by reusing) test metrics associated with a first version of the application. The first version of the application can be the blue application instance 138 (e.g., a current version N) that is live. In some embodiments, in 404, the first version of the application can be live and associated with a first endpoint (e.g., a live endpoint), and the second version of the application can be idle and associated with a second endpoint (e.g., an idle endpoint) different from the first endpoint. The test metrics can include a set of KPIs and KPI metadata associated with the first version of the application. The set of KPIs can include, but are not limited to, KPI 134. Further in 404, in some embodiments, system 100 can automatically test the second version of the application based on a duplicate set of KPIs and duplicate KPI metadata. The duplicate set of KPIs can include, but are not limited to, KPI copy 136.

In 406, system 100 automatically determines whether the automatic testing of the second version of the application is successful. Further in 406, system 100 can automatically generate an automatic determination that the automatic testing of the second version of the application is successful if the test results of the automatic testing of the second version of the application meet or exceed one or more automated testing criteria (e.g., all automatic tests are successful or exceed a minimum success value such as 70 percent). Further in 406, system 100 can automatically generate an automatic determination that the automatic testing of the second version of the application is unsuccessful if the test results of the automatic testing of the second version of the application do not meet or exceed the one or more automated testing criteria. In response to an automatic determination that the automatic testing of the second version of the application is successful, 406 proceeds to 408. In response to an automatic determination that the automatic testing of the second version of the application is unsuccessful, 406 proceeds to 410.

In 408, system 100 automatically sets live the second version of the application in response to an automatic determination that the automatic testing of the second version of the application is successful. For example, system 100 can automatically set live the second version of the application by automatically exchanging the first endpoint associated with the first version of the application with the second endpoint associated with the second version of the application to set live the second version of the application and set idle the first version of the application. Further in 408, system 100 can automatically destroy the first version of the application or otherwise place the first version of the application in termination.

In 410, system 100 automatically destroys the second version of the application in response to an automatic determination that the automatic testing of the second version of the application is unsuccessful. Alternatively, in 410, system 100 can place the second version of the application in termination.

Figure 5:
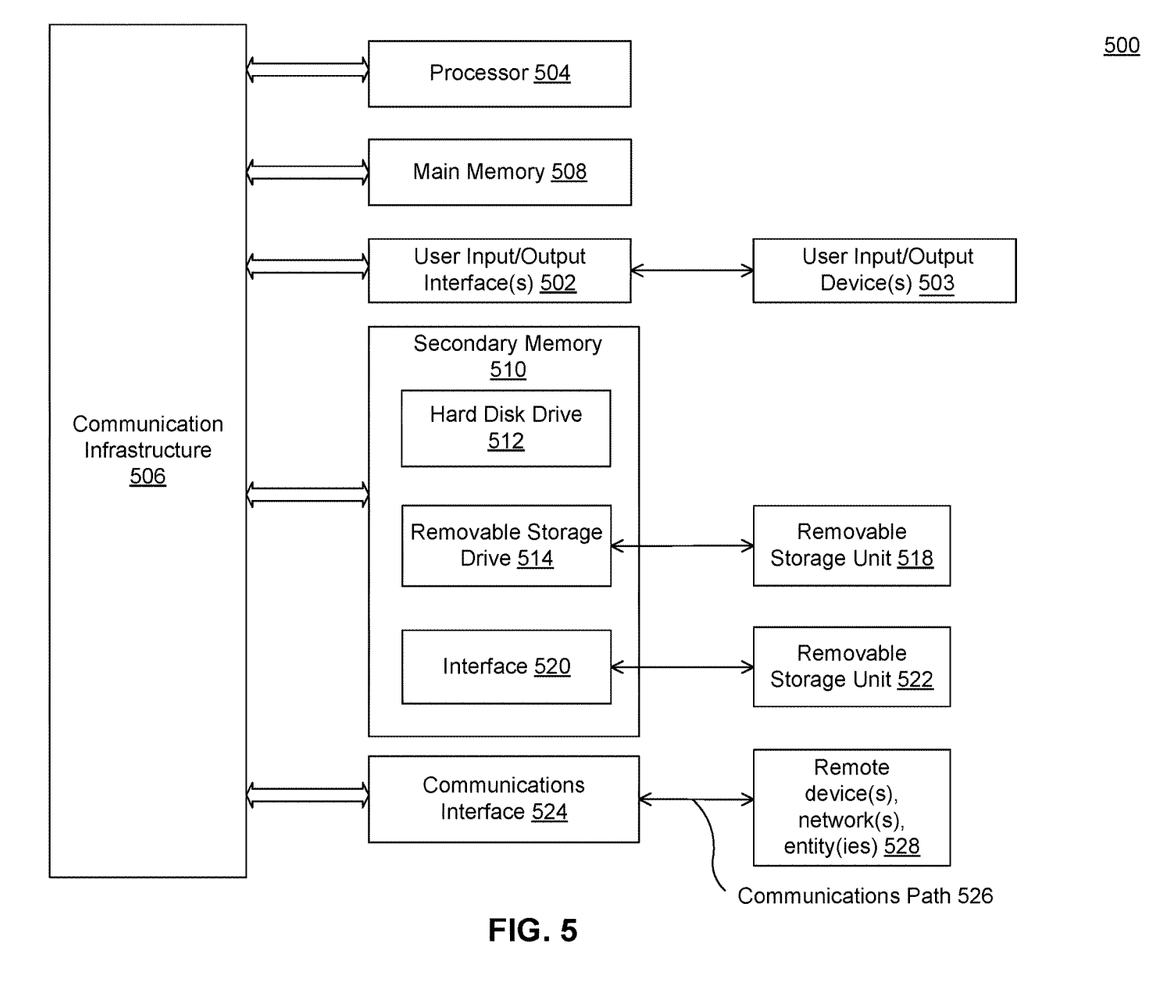
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., BaaS, MBaaS, CaaS, DCaaS, DaaS, FaaS, IaaS, PaaS, SaaS, MSaaS, any other suitable "as a service" model, or any combination thereof); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

There are many exemplary aspects to the system, apparatus, device, method and/or computer program product embodiments, and/or combinations and sub-combinations thereof, disclosed herein. For example, embodiments of the present disclosure provide for increased automation of the deployment process without additional manual interaction. In another example, embodiments of the present disclosure provide for making blue-green deployment safer, faster (e.g., substantially zero downtime), and more effective due to automated testing that reuses existing, up-to-date test metrics instead of re-implementing those tests with double maintenance of test metrics. In another example, embodiments of the present disclosure provide for automatically testing new application versions using the latest version of KPIs during each deployment iteration. In another example, embodiments of the present disclosure provide for automatically testing new application versions in real infrastructure (e.g., using a different endpoint than the current, live application version) and in much more detail. In another example, embodiments of the present disclosure provide for utilizing the test metrics generated by the automated testing of new software versions to increase the test quality of the current software version. As a result of these and other embodiments described herein, overall test coverage and quality is increased.

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A computer implemented method for testing software in a continuous deployment pipeline, comprising:
   automatically deploying, by at least one processor, a second version of an application;
   automatically testing, by the at least one processor, the second version of the application based on test metrics associated with a first version of the application;
   automatically determining whether the automatic testing of the second version of the application is successful; and
   in response to determining that the automatic testing of the second version of the application was successful, automatically setting live, by the at least one processor, the second version of the application,
   wherein prior to automatically setting live the second version of the application:
      the first version of the application is live and associated with a first endpoint, and
      the second version of the application is idle and associated with a second endpoint; and
   wherein the setting live comprises automatically exchanging, by the at least one processor, the first endpoint with the second endpoint to:
      set live the second version of the application, and
      set idle the first version of the application.

2. The method of claim 1, further comprising:
   automatically destroying, by the at least one processor, the first version of the application.

3. The method of claim 1, further comprising:
   receiving, by the at least one processor, a request to access the application; and
   automatically routing, by the at least one processor, the request to the second version of the application.

4. The method of claim 1, further comprising:
   in response to automatically determining that the automatic testing of the second version of the application is unsuccessful,
      automatically destroying, by the at least one processor, the second version of the application.

5. The method of claim 4, further comprising:
   receiving, by the at least one processor, a request to access the application; and
   automatically routing, by the at least one processor, the request to the first version of the application.

6. The method of claim 1, wherein the test metrics comprise a key performance indicator associated with the first version of the application.

7. The method of claim 6, the automatically testing further comprising:
   automatically testing, by at least one processor, the second version of the application based on a duplicate of the key performance indicator.

8. A system, comprising:
   a memory; and
   at least one processor coupled to the memory and configured to:
      automatically deploy a second version of an application;
      automatically test the second version of the application based on test metrics associated with a first version of the application;
      automatically determine whether the automatic testing of the second version of the application is successful; and
      in response to the automatic determination that the automatic testing of the second version of the application is successful, automatically set live the second version of the application,
   wherein prior to a setting live of the second version of the application:
      the first version of the application is live and associated with a first endpoint, and
      the second version of the application is idle and associated with a second endpoint; and
   wherein to automatically set live the second version of the application, the at least one processor is configured to:
      automatically exchange the first endpoint with the second endpoint to:
         set live the second version of the application, and
         set idle the first version of the application.

9. The system of claim 8, the at least one processor further configured to:
   automatically destroy the first version of the application.

10. The system of claim 8, the at least one processor further configured to:
    receive a request to access the application; and
    automatically route the request to the second version of the application.

11. The system of claim 8, the at least one processor further configured to:
    in response to an automatic determination that an automatic testing of the second version of the application is unsuccessful,
       automatically destroy the second version of the application.

12. The system of claim 11, the at least one processor further configured to:
    receive a request to access the application; and
    automatically route the request to the first version of the application.

13. The system of claim 8, wherein the test metrics comprise a key performance indicator associated with the first version of the application.

14. The system of claim 13, wherein to automatically test, the at least one processor is configured to:
    automatically test the second version of the application based on a duplicate of the key performance indicator.

15. A non-transitory computer-readable medium having instructions stored thereon that, when executed by at least one computing device, cause the at least one computing device to perform operations comprising:
    automatically deploying a second version of an application;
    automatically testing the second version of the application based on test metrics associated with a first version of the application;
    automatically determining whether the automatic testing of the second version of the application is successful; and in response to automatically determining that the automatic testing of the second version of the application is successful, automatically setting live the second version of the application, wherein prior to automatically setting live the second version of the application:
  the first version of the application is live and associated with a first endpoint, and
  the second version of the application is idle and associated with a second endpoint; and wherein the setting live comprises automatically exchanging the first endpoint with the second endpoint to:
  set live the second version of the application, and
  set idle the first version of the application.

16. The non-transitory computer-readable medium of claim 15, the operations further comprising:
  automatically destroying, by the at least one processor, the first version of the application.

17. The non-transitory computer-readable medium of claim 15, the operations further comprising:
  in response to automatically determining that the automatic testing of the second version of the application is unsuccessful,
    automatically destroying the second version of the application.

* * * * *